United States Patent
Yao et al.

(10) Patent No.: US 11,257,625 B2
(45) Date of Patent: Feb. 22, 2022

(54) MULTILAYER CERAMIC CAPACITOR

(71) Applicant: Murata Manufacturing Co., Ltd., Nagaokakyo (JP)

(72) Inventors: Yuichiro Yao, Nagaokakyo (JP); Keisuke Fukumura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 331 days.

(21) Appl. No.: 16/654,053

(22) Filed: Oct. 16, 2019

(65) Prior Publication Data

US 2020/0126731 A1  Apr. 23, 2020

(30) Foreign Application Priority Data

Oct. 22, 2018 (JP) .............................. JP2018-198243

(51) Int. Cl.
| | |
|---|---|
| *H01G 4/30* | (2006.01) |
| *H01G 4/12* | (2006.01) |
| *H01G 4/232* | (2006.01) |
| *C04B 35/468* | (2006.01) |
| *H01G 4/008* | (2006.01) |

(52) U.S. Cl.
CPC ........... *H01G 4/30* (2013.01); *C04B 35/4682* (2013.01); *H01G 4/008* (2013.01); *H01G 4/1209* (2013.01); *H01G 4/232* (2013.01); *C04B 2235/5445* (2013.01); *C04B 2235/785* (2013.01)

(58) Field of Classification Search
CPC ........ H01G 4/30; H01G 4/008; H01G 4/1209; H01G 4/232
See application file for complete search history.

(56) References Cited

U.S. PATENT DOCUMENTS

| | | | |
|---|---|---|---|
| 6,205,014 B1 | 3/2001 | Inomata et al. | |
| 2016/0126014 A1* | 5/2016 | Lee ....................... | H01G 4/1209 361/301.4 |
| 2020/0126731 A1* | 4/2020 | Yao ..................... | C04B 35/4682 |

FOREIGN PATENT DOCUMENTS

| | | | | |
|---|---|---|---|---|
| CN | 103050282 B | * | 6/2016 | ............... H01G 4/30 |
| JP | 11-317322 A | | 11/1999 | |
| JP | 3775366 B2 | * | 5/2006 | ............... H01G 4/30 |
| JP | 3908458 B2 | * | 4/2007 | ........... H01G 4/1227 |
| KR | 20080032883 A | * | 4/2008 | ............... H01G 4/30 |

* cited by examiner

*Primary Examiner* — Dion R. Ferguson
(74) *Attorney, Agent, or Firm* — Keating & Bennett, LLP (57) ABSTRACT

A multilayer ceramic capacitor includes a multilayer body in which a plurality of internal electrodes including Ni and a plurality of ceramic dielectric layers are alternately stacked, and external electrodes. The ceramic dielectric layer includes an inner dielectric layer located between internal electrodes, and an outer dielectric layer located outside in a stacking direction and including at least NiO. A difference between average grain sizes of dielectric grains of the outer dielectric layers and the inner dielectric layers is about 10% or less. A molar amount of NiO with respect to about 100 moles of Ti is larger by about 0.6 mole or more in the outer dielectric layer than in the inner dielectric layer.

9 Claims, 4 Drawing Sheets

MULTILAYER CERAMIC CAPACITOR

CROSS REFERENCE TO RELATED APPLICATIONS

This application claims the benefit of priority to Japanese Patent Application No. 2018-198243 filed on Oct. 22, 2018. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, a multilayer ceramic capacitor is known that includes a multilayer body in which a plurality of internal electrodes and dielectric layers are alternately stacked, and a plurality of external electrodes provided on a surface of the multilayer body and electrically connected to the internal electrodes.

Japanese Patent Application Laid-Open No. 11-317322 describes a multilayer ceramic capacitor having such a configuration, and also describes that a multilayer body is obtained by stacking a plurality of ceramic green sheets and firing them. Specifically, the document describes that the above-described multilayer body is obtained by stacking a plurality of ceramic green sheets on which a conductive pattern is not printed, thereafter stacking thereon a plurality of ceramic green sheets on which the conductive pattern is printed and further stacking thereon a plurality of ceramic green sheets on which the conductive pattern is not printed, and firing the stacked sheets.

However, in the multilayer body produced by the above-described method, since the degrees of thermal contraction of the internal electrodes and the dielectric layers are different at the time of firing, peeling of the dielectric layer, in particular, peeling between an internal electrode located outermost in a stacking direction and a dielectric layer adjacent on an outside thereof may occur.

SUMMARY OF THE INVENTION

Preferred embodiments of the present invention provide multilayer ceramic capacitors that are each able to significantly reduce or prevent peeling between an internal electrode located outermost and a dielectric layer adjacent to an outside thereof.

A multilayer ceramic capacitor according to the present invention includes a multilayer body in which a plurality of internal electrodes and a plurality of ceramic dielectric layers are alternately stacked, and external electrodes provided on surfaces of the multilayer body and electrically connected to the internal electrodes. The multilayer body includes a first main surface and a second main surface that oppose each other in a stacking direction, a first side surface and a second side surface that oppose each other in a width direction orthogonal or substantially orthogonal to the stacking direction, and a first end surface and a second end surface that oppose each other in a length direction orthogonal or substantially orthogonal to the stacking direction and the width direction. The internal electrodes include Ni. The dielectric layers include an outer dielectric layer located further outside, in the stacking direction, than an outermost one of the internal electrodes in the stacking direction. The outer dielectric layer includes at least Ti and NiO. The dielectric layers also include an inner dielectric layer located between two of the internal electrodes adjacent to each other in the stacking direction. The inner dielectric layer includes at least Ti. An average grain size of dielectric grains included in the dielectric layers is about 180 nm or more and about 220 nm or less, a difference between an average grain size of dielectric grains included in the outer dielectric layer and an average grain size of dielectric grains included in the inner dielectric layer with respect to an average grain size of dielectric grains included in the inner dielectric layer is about 10% or less, a thickness of the inner dielectric layer is about 4 μm or more, a thickness of the outer dielectric layer is about 100 μm or more and about 200 μm or less, and thicknesses of the inner electrodes are about 1 μm or more, and a molar amount of NiO with respect to about 100 moles of Ti included in the outer dielectric layer is larger by about 0.6 mole or more than a molar amount of NiO with respect to about 100 moles of Ti included in the inner dielectric layer.

A dimension in the length direction of the multilayer body may be about 1.2 mm or more, a dimension in the width direction of the multilayer body may be about 0.6 mm or more, and a dimension in the stacking direction of the multilayer body may be about 0.6 mm or more.

A difference between continuity of an internal electrode located in a central portion in the stacking direction and continuity of the internal electrode located outermost in the stacking direction with respect to continuity of the internal electrode located in the center portion in the stacking direction may be about 10% or less.

In a multilayer ceramic capacitor according to a preferred embodiment of the present invention, the molar amount of NiO included in the outer dielectric layer with respect to 100 moles of Ti is larger by about 0.6 mole or more than the molar amount of NiO included in the inner dielectric layer with respect to 100 moles of Ti, and thus grain growth of dielectric grains in the outer dielectric layer is significantly reduced or prevented in a firing step in production of the multilayer ceramic capacitor. Thus, peeling between an internal electrode located outermost in the stacking direction and the outer dielectric layer can be significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings, and features of preferred embodiments of the present invention will be specifically described.

Figure 1:
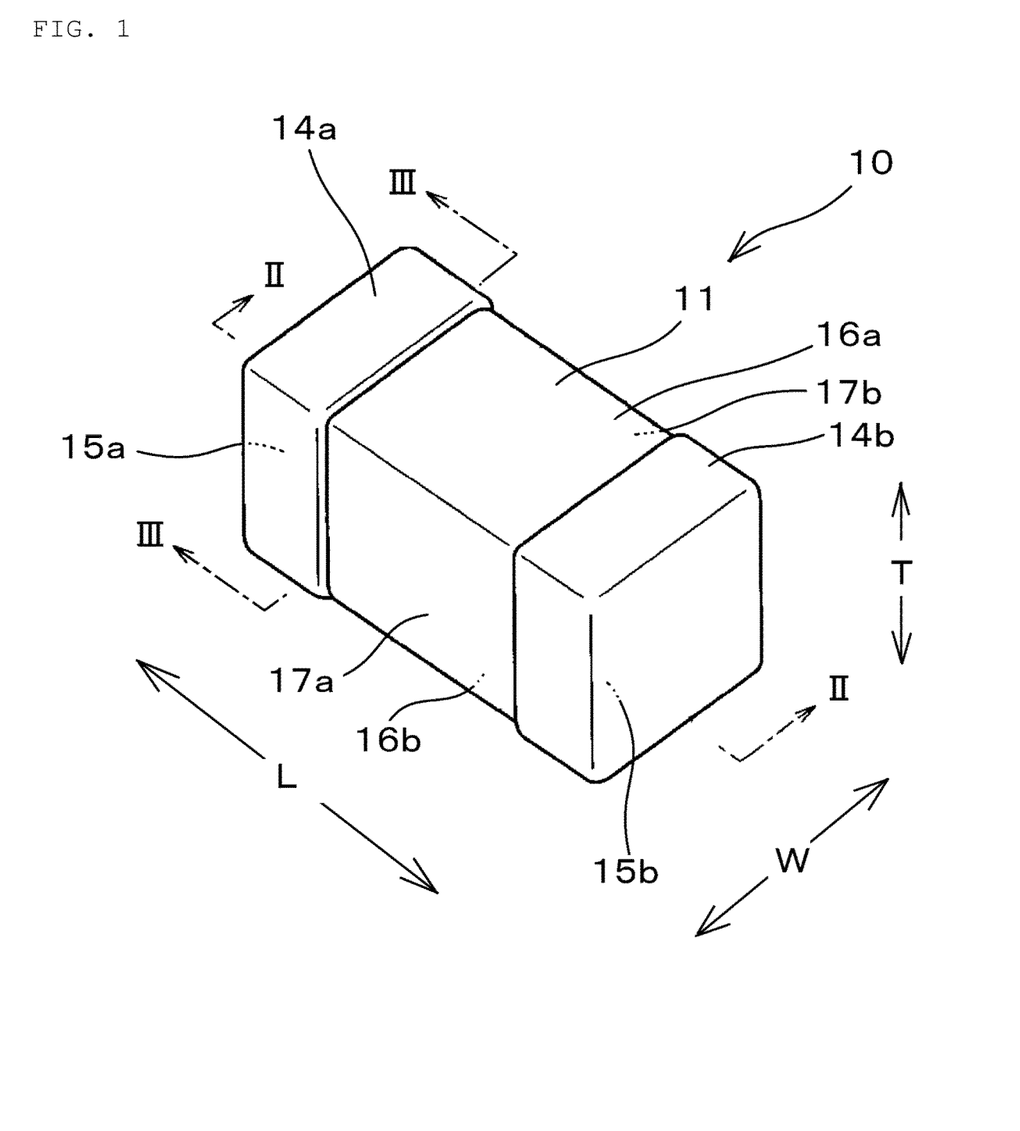
FIG. 1 is a perspective view showing an example of a multilayer ceramic capacitor according to a preferred embodiment of the present invention.
Figure 2:
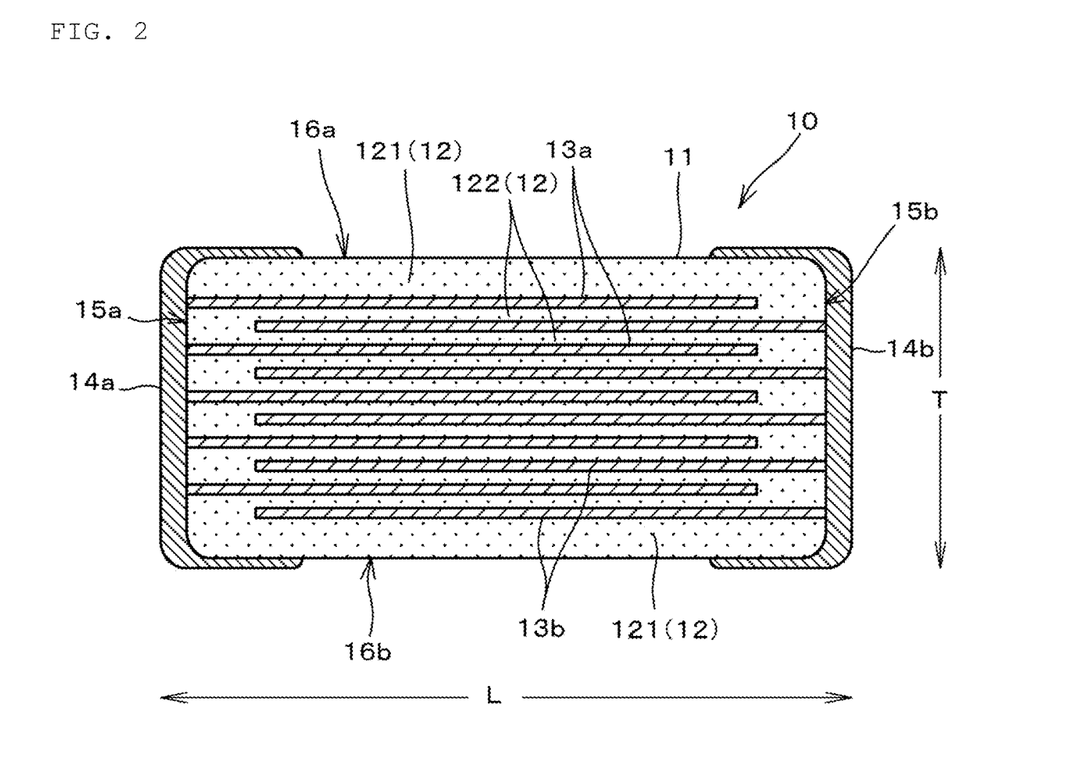
FIG. 2 is a cross-sectional view of the multilayer ceramic capacitor shown in FIG. 1 taken along a line II-II.
Figure 3:
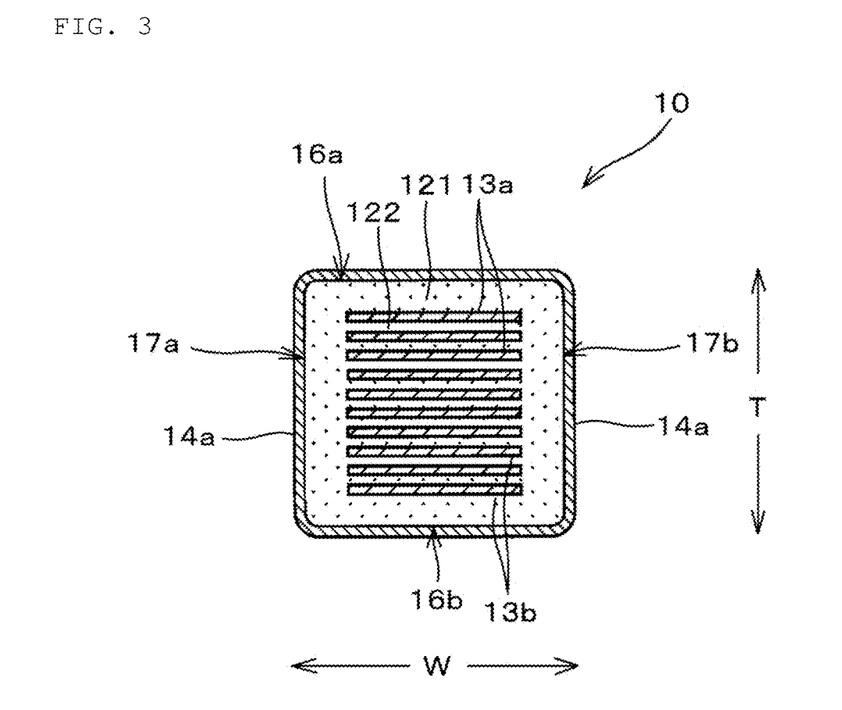
FIG. 3 is a cross-sectional view of the multilayer ceramic capacitor shown in FIG. 1 taken along a line III-III.

FIG. 1 is a perspective view showing an example of a multilayer ceramic capacitor 10 according to a preferred embodiment of the present invention. FIG. 2 is a cross-sectional view of the multilayer ceramic capacitor 10 shown in FIG. 1 taken along a line II-II. FIG. 3 is a cross-sectional view of the multilayer ceramic capacitor 10 shown in FIG. 1 taken along a line III-III.

As shown in FIGS. 1 to 3, the multilayer ceramic capacitor 10 preferably has a rectangular parallelepiped or a substantially rectangular parallelepiped shape as a whole, and includes a multilayer body 11 and a pair of external electrodes 14a, 14b provided on a surface of the multilayer body 11. The pair of external electrodes 14a, 14b face each other as shown in FIG. 1.

Here, a direction in which the pair of external electrodes 14 oppose each other is defined as a length direction L of the multilayer ceramic capacitor 10, a stacking direction of the internal electrodes 13a, 13b described later is defined as a stacking direction T, and a direction orthogonal or substantially orthogonal to both of the length direction L and the stacking direction T is defined as a width direction W.

The multilayer body 11 includes a first end surface 15a and a second end surface 15b opposing each other in the length direction L, a first main surface 16a and a second main surface 16b opposing each other in the stacking direction T, and a first side surface 17a and a second side surface 17b opposing each other in the width direction W.

A first external electrode 14a is provided on the first end surface 15a, and a second external electrode 14b is provided on the second end surface 15b.

The multilayer ceramic capacitor 10 in the present preferred embodiment is, for example, mounted on a car and used. Preferably, a dimension in the length direction L of the multilayer body 11 is about 1.2 mm or more, a dimension in the width direction W thereof is about 0.6 mm or more, and a dimension in the stacking direction T thereof is about 0.6 mm or more, for example. The dimension in the length direction L and the dimension in the width direction W of the multilayer body 11 are dimensions in a central portion in the stacking direction T of the multilayer body 11, and the dimension in the stacking direction T is a dimension in a central portion in the length direction L of the multilayer body 11. The dimensions of the multilayer body 11 can be measured with a micrometer or an optical microscope.

The multilayer body 11 preferably has rounded corners and ridges. Here, a corner is a portion at which three faces of the multilayer body 11 intersect, and a ridge is a portion at which two faces of the multilayer body 11 intersect.

As shown in FIGS. 2 and 3, the multilayer body 11 has a structure in which a plurality of ceramic dielectric layers 12 and pluralities of internal electrodes 13a, 13b are alternately stacked. More specifically, the internal electrodes include first internal electrodes 13a and second internal electrodes 13b, and a plurality of first internal electrodes 13a and a plurality of second internal electrodes 13b are alternately stacked in the stacking direction T with inner dielectric layers 122 of the ceramic dielectric layers 12 described later located therebetween.

Note that although FIGS. 2 and 3 show an example in which five first internal electrodes 13a and five second internal electrodes 13b are provided, the numbers of first internal electrodes 13a and second internal electrodes 13b are not limited to five.

The ceramic dielectric layers 12 include outer dielectric layers 121 each located on an outside in the stacking direction T of the internal electrodes 13a, 13b located outermost in the stacking direction T, and inner dielectric layers 122 each located between two internal electrodes adjacent to each other in the stacking direction T, that is, between a first internal electrode 13a and a second internal electrode 13b.

A thickness of an inner dielectric layer 122 is preferably about 4 μm or more, for example. Further, a thickness of an outer dielectric layer 121 is preferably about 100 μm or more and about 200 μm or less, for example. The thickness of the inner dielectric layer 122 and the thickness of the outer dielectric layer 121 are thicknesses at a position in a central portion in the width direction W of the multilayer body 11.

The ceramic dielectric layers 12 preferably include, for example, dielectric grains of a perovskite structure including, for example, at least Ti, such as $BaTiO_3$, $CaTiO_3$, $SrTiO_3$, as a main component. The main components described above may include subcomponents, such as Mn compounds, Fe compounds, Ce compounds, Co compounds, and Ni compounds, for example, that are lower in content than the main component.

An average grain size of the dielectric grains included in the ceramic dielectric layers 12 is preferably about 180 nm or more and about 220 nm or less, for example. Further, with respect to an average grain size D1 of dielectric grains included in the inner dielectric layer 122, a difference between an average grain size D2 of dielectric grains included in the outer dielectric layer 121 and the average grain size D1 of dielectric grains included in the inner dielectric layer 122 is preferably about 10% or less, for example. That is, the relationship of the following equation (1) is satisfied.

$$(D2-D1)/D1 \leq 0.1 \tag{1}$$

The average grain size of dielectric grains can be measured by the following method. First, polishing is performed until a surface including the width direction and the stacking direction is exposed at the central portion in the length direction, to expose a cross section. In the central portion in the width direction of the outer dielectric layer 121, a portion about 20 μm inside the outer layer surface is imaged with a magnification of 20000 using an electron microscope. Two hundred dielectric grains are randomly selected in the field of view, and cross-sectional areas of dielectric grains are measured by image processing. Diameters are calculated from the cross-sectional areas, and an average grain size is obtained by taking an average of 200 grains. Similarly, an average grain size is measured in the inner dielectric layer 122 in a central portion in the stacking direction.

The outer dielectric layer 121 preferably includes NiO, for example. More specifically, a molar amount of NiO included in the outer dielectric layer 121 with respect to 100 moles of Ti is preferably, for example, larger by about 0.6 mole or more than a molar amount of NiO included in the inner dielectric layer 122 with respect to 100 moles of Ti. That is, assuming that the molar amount of NiO included in the outer dielectric layer 121 with respect to 100 moles of Ti is M1 moles, and the molar amount of NiO included in the inner dielectric layer 122 with respect to 100 moles of Ti is M2 moles, the following relationship (2) is satisfied.

$$M1 \geq M2 + 0.6 \tag{2}$$

However, the content of NiO included in the inner dielectric layer 122 may be 0 (zero). The content of NiO can be measured, for example, by identifying a segregation site with a wavelength dispersive X-ray analyzer, and measuring therein with a transmission electron microscope.

Since NiO is included in the outer dielectric layers 121, grain growth of dielectric grains in the outer dielectric layer 121 is significantly reduced or prevented in a firing step when the multilayer ceramic capacitor 10 is manufactured. Thus, it is possible to significantly reduce or prevent peeling between the internal electrodes 13a, 13b located outermost in the stacking direction T and the outer dielectric layers 121. In addition, since grain growth of the dielectric grains is significantly reduced or prevented, a crack generated in the outer dielectric layers 121 does not reach the internal electrodes 13a, 13b, which excels in reliability.

Further, since NiO is included in the outer dielectric layer 121, deterioration of the internal electrodes 13a, 13b located outermost in the stacking direction T can be significantly reduced or prevented. That is, continuity of the internal electrodes 13a, 13b to be described later is significantly improved, and thus it is possible to significantly reduce or prevent decrease in electrostatic capacitance due to decrease in continuity of the internal electrodes 13a, 13b.

Here, peeling of the outer dielectric layers 121 and deterioration of the internal electrodes 13a, 13b occur more easily in a multilayer ceramic capacitor of large size, with the dimension in the length direction L of the multilayer body 11 being about 1.2 mm or more, the dimension in the width direction W being about 0.6 mm or more, and the dimension in the stacking direction T being about 0.6 mm or more, for example. However, as in the multilayer ceramic capacitor 10 according to the present preferred embodiment, by the outer dielectric layer 121 including more molar amount of NiO with respect to 100 moles of Ti by about 0.6 mole or more as compared to the inner dielectric layer 22, peeling between the internal electrodes 13a, 13b located outermost in the stacking direction T and the outer dielectric layers 121 and deterioration of the internal electrodes 13a, 13b can be effectively significantly reduced or prevented.

The first internal electrodes 13a are extended to the first end surface 15a of the multilayer body 11. Further, the second internal electrodes 13b are extended to the second end surface 15b of the multilayer body 11.

A first internal electrode 13a includes a counter electrode portion which is a portion opposing a second internal electrode 13b, and an extended electrode portion which is a portion extended from the counter electrode portion to the first end surface 15a of the multilayer body 11. Further, a second internal electrode 13b includes a counter electrode portion which is a portion opposing a first internal electrode 13a nd an extended electrode portion which is a portion extended from the counter electrode portion to the second end surface 15b of the multilayer body 11.

The counter electrode portion of the first internal electrode 13a and the counter electrode portion of the second internal electrode 13b oppose each other with the inner dielectric layer 122 located therebetween to define a capacitance, thus defining and functioning as a capacitor.

The first internal electrode 13a and the second internal electrode 13b preferably include Ni, for example. The first internal electrode 13a and the second internal electrode 13b may preferably further include dielectric grains of the same or substantially the same composition as the ceramic included in the ceramic dielectric layers 12.

Thicknesses of the first internal electrode 13a and the second internal electrode 13b are preferably about 1 μm or more, for example. Further, the number of internal electrodes including the first internal electrodes 13a and the second internal electrodes 13b is preferably, for example, 350.

With respect to continuity of the internal electrodes located in the central portion in the stacking direction T among the first internal electrodes 13a and the second internal electrodes 13b, a difference between continuity of the internal electrodes located in the central portion in the stacking direction T and continuity of the internal electrodes located outermost in the stacking direction T is preferably about 10% or less, for example. The "central portion in the stacking direction T" may not be the perfect center in the stacking direction T, and may be substantially the center. The continuity of internal electrodes can be determined by the following method.

Figure 4:
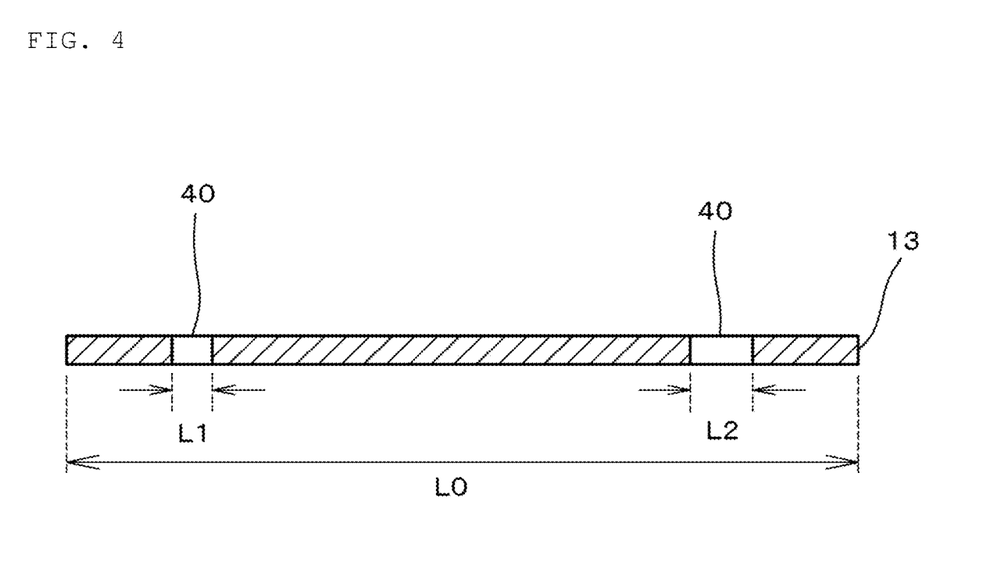
FIG. 4 is a cross-sectional view of an internal electrode when a cross section defined by a length direction and a stacking direction of a multilayer body is exposed at a central portion in a width direction of the multilayer body.

FIG. 4 is a cross-sectional view of an internal electrode 13 located in the central portion in the stacking direction T when a cross section defined by the length direction L and the stacking direction T of the multilayer body 11 is exposed at the central portion in the width direction W of the multilayer body 11. The internal electrode 13 is any one of the first internal electrodes 13a and the second internal electrodes 13b.

As shown in FIG. 4, in the internal electrode 13, a cavity 40 may be partially provided. Here, based on a dimension L0 in the length direction L of the internal electrode 13 and a total dimension (L1+L2) in the length direction L of a plurality of cavities 40, K defined by the following equation (3) is defined as the continuity of the internal electrodes 13.

$$K = \{1 - (L1+L2)/L0\} \times 100 \quad (3)$$

Therefore, assuming that continuity of the internal electrodes located in the central portion in the stacking direction T is K1 and continuity of the internal electrode located outermost in the stacking direction T is K2, the relationship of the following equation (4) is satisfied.

$$(K1-K2)/K1 \leq 0.1 \quad (4)$$

Here, thicknesses of the ceramic dielectric layers 12 and thicknesses of the internal electrodes (the first internal electrodes 13a and the second internal electrodes 13b) can be measured by the following method.

First, by polishing a surface defined by the stacking direction T and the width direction W of the multilayer body 11, in other words, a plane orthogonal or substantially orthogonal to the length direction L of the multilayer body 11, a cross section is exposed, and the cross section is observed with a scanning electron microscope. Next, thicknesses of the ceramic dielectric layers 12 are measured on a total of five lines of a center line along the thickness direction passing through the center of the exposed cross section, and two lines drawn at an equal or substantially equal interval on each of both sides of this center line. The average value of the five measured values is taken as the thickness of the ceramic dielectric layers 12.

In addition, in order to measure more accurately, the multilayer body 11 is divided into an upper portion, a central portion, and a lower portion in the stacking direction T, and the five measured values described above are obtained in each of the upper portion, the central portion, and the lower portion. The average value of all the measured values obtained is taken as the thickness of the ceramic dielectric layers 12.

Although the method of measuring the thickness of the ceramic dielectric layers 12 has been described above, the thicknesses of the first internal electrode 13a and the second internal electrode 13b can also be measured using a scanning electron microscope with respect to the same cross sections as the cross sections where the thickness of the ceramic dielectric layers 12 is measured by a method conforming to the method of measuring the thickness of the ceramic dielectric layers 12.

The first external electrode 14a is provided on the entire or substantially the entire first end surface 15a of the multilayer body 11, and wraps around from the first end surface 15a to the first main surface 16a, the second main surface 16b, the first side surface 17a, and the second side surface 17b. The first external electrode 14a is electrically connected to the first internal electrodes 13a.

The second external electrode 14b is provided on the entire or substantially the entire second end surface 15b of the multilayer body 11, and wraps around from the second end surface 15b to the first main surface 16a, the second main surface 16b, the first side surface 17a, and the second side surface 17b. The second external electrode 14b is electrically connected to the second internal electrodes 13b.

The first external electrode 14a and the second external electrode 14b each preferably include, for example, an underlying electrode layer and a plating layer disposed on the underlying electrode layer.

The underlying electrode layer includes at least one of layers such as, for example, a baked electrode layer, a resin electrode layer, and a thin film electrode layer as described below.

The baked electrode layer is a layer preferably including glass and metal, and may be a single layer or a plurality of layers. The baked electrode layer preferably includes, for example, a metal such as Cu, Ni, Ag, Pd, and Au, or an alloy of Ag and Pd.

The baked electrode layer is formed by applying a conductive paste including glass and metal to the multilayer body and baking the conductive paste. The baking may be performed simultaneously with firing of the multilayer body, or may be performed after firing of the multilayer body.

The resin electrode layer can be formed, for example, as a layer including conductive grains and thermosetting resin. When forming the resin electrode layer, it may be formed directly on the multilayer body without forming the baked electrode layer. The resin electrode layer may be a single layer or a plurality of layers.

The thin film electrode layer is preferably, for example, a layer having a thickness of about 1 µm or less in which metal grains are deposited, and can be formed by a known thin film forming method, such as a sputtering method or a vapor deposition method, for example.

The plating layer disposed on the underlying electrode layer preferably includes, for example, at least one of a metal such as Cu, Ni, Ag, Pd, and Au, or an alloy of Ag and Pd. The plating layer may be a single layer or a plurality of layers. However, the plating layer preferably has a two-layer structure including a Ni plating layer and a Sn plating layer. The Ni plating layer prevents the underlying electrode layer from being corroded by solder when mounting the multilayer ceramic capacitor 10. The Sn plating layer significantly improve wettability of solder when the multilayer ceramic capacitor 10 is mounted.

In addition, the first external electrode 14a and the second external electrode 14b may be defined by a plating layer directly disposed on the multilayer body 11 without including the above-described underlying electrode layer. In this case, the plating layer is directly connected to the first internal electrodes 13a or the second internal electrodes 13b. In the following, details of the plating layer will be described in the case where the first external electrode 14a and the second external electrode 14b do not include the above-described underlying electrode layer but include a plating layer provided directly on the multilayer body 11.

The plating layer preferably includes a first plating layer provided on the multilayer body 11 and a second plating layer provided on the first plating layer. However, when the plating layer is formed by an electroless plating method, a catalyst may be provided on the multilayer body 11.

The first plating layer and the second plating layer preferably include, for example, one metal selected from the group consisting of Cu, Ni, Sn, Pb, Au, Ag, Pd, Bi, and Zn, or an alloy including the metal.

When Ni is included as the internal electrode as in the present preferred embodiment, it is preferable to include Cu having a good bonding property with Ni as the first plating layer. Further, it is preferable to include Sn and Au with good solder wettability as the second plating layer. In addition, Ni having solder barrier performance may be included as the first plating layer.

The second plating layer may be provided as needed. Therefore, the first external electrode 14a and the second external electrode 14b may include only the first plating layer. In addition to the first plating layer and the second plating layer, the first external electrode 14a and the second external electrode 14b may further include another plating layer provided on the second plating layer.

It is preferable that the ratio of metal per unit volume of a plating layer is about 99 volume % or more, for example. Moreover, it is preferable that a plating layer do not include glass.

Evaluation of Characteristics

Multilayer ceramic capacitors having different contents of NiO included in the outer dielectric layer were prepared, and a moisture resistance reliability test and a solder heat resistance test were conducted. Table 1 shows results of the moisture resistance reliability test and the solder heat resistance test for multilayer ceramic capacitors of sample numbers 1 to 7 having different contents of NiO included in the outer dielectric layer. Note that in the multilayer ceramic capacitors of the sample numbers 1 to 7, the inner dielectric layer does not include NiO.

TABLE 1

| Sample number | Average grain size of dielectric grains (µm) | | NiO content (mole) of outer dielectric layer | Moisture resistance reliability test Number of defects | Solder heat resistance test Number of defects |
| --- | --- | --- | --- | --- | --- |
| | Outer dielectric layer | Inner dielectric layer | | | |
| 1 | 200 | 200 | 0.9 | 0/10000 | 0/20 |
| 2 | 200 | 200 | 0.8 | 0/10000 | 0/20 |
| 3 | 200 | 200 | 0.7 | 0/10000 | 0/20 |
| 4 | 200 | 200 | 0.6 | 0/10000 | 0/20 |
| 5* | 400 | 200 | 0.5 | 1/10000 | 3/20 |
| 6* | 900 | 200 | 0.4 | 4/10000 | 10/20 |
| 7* | 1200 | 200 | 0 | 6/10000 | 19/20 |

Dimensions of the multilayer bodies of the multilayer ceramic capacitors of the sample numbers 1 to 7 are about 3.2 mm in the length direction L, about 2.5 mm in the width direction W, and about 2.5 mm in the stacking direction T. Further, the thickness of the dielectric layer is about 5.2 µm, the thickness of the outer dielectric layer is about 155 µm, the thickness of the internal electrode is about 1.1 µm, and the number of internal electrodes is 357.

As described above, the multilayer ceramic capacitors of sample numbers 1 to 7 differ in the content of NiO included in the outer dielectric layer. As shown in Table 1, the contents of NiO included in the outer dielectric layer of the multilayer ceramic capacitors of the sample numbers 1 to 7 are about 0.9 mole, about 0.8 mole, about 0.7 mole, about 0.6 mole, about 0.5 mole, about 0.4 mole, and 0 mole, respectively, with respect to 100 moles of Ti.

The multilayer ceramic capacitors of the sample numbers 1 to 4 meet requirements of preferred embodiments of the present invention, the internal electrodes include Ni, the dielectric layers include an outer dielectric layer located on an outside in the stacking direction of internal electrodes located outermost in the stacking direction and include at least NiO, and an inner dielectric layer located between two of the internal electrodes adjacent to each other in the stacking direction, and the average grain size of dielectric grains included in the dielectric layers is about 180 nm or more and about 220 nm or less, a ratio of a difference between an average grain size D1 of dielectric grains included "in the inner dielectric layer and an average grain size D2 of dielectric grains included in the outer dielectric layer with respect to the average grain size D1 of dielectric grains included in the inner dielectric layer is ±about 10% or less, a thickness of the inner dielectric layer is about 4 μm or more, a thickness of the outer dielectric layer is about 100 μm or more and about 200 μm or less, thicknesses of the internal electrodes are about 1 μm or more, and the outer dielectric layer includes more amount of NiO with respect to about 100 moles of Ti by about 0.6 mole or more than the inner dielectric layer." On the other hand, the multilayer ceramic capacitors of the sample numbers 5 to 7 indicated by in Table 1 do not satisfy the requirements of preferred embodiments of the present invention described above.

In the moisture resistance reliability test, 10000 multilayer ceramic capacitors of each of the sample numbers 1 to 7 were prepared, and voltage of about 100 V was applied under an environment at a temperature of about 85° C. and with humidity of about 85%, and the number of defective products with deteriorated resistance values was checked.

Further, in the solder heat resistance test, 20 multilayer ceramic capacitors of each of the sample numbers 1 to were prepared, and the multilayer ceramic capacitors were immersed in a solder bath heated to about 300° C. for about 3 seconds. Then, for the multilayer ceramic capacitor after immersion, the presence or absence of peeling between the internal electrodes 13a, 13b located outermost in the stacking direction T and the outer dielectric layer was checked, and the number of defective products with peeling was checked.

As shown in Table 1, in the multilayer ceramic capacitors of the sample numbers 1 to 4 satisfying the requirements of preferred embodiments of the present invention, the difference between the average grain size of the dielectric grains included in the outer dielectric layers and the average grain size of the dielectric grains included in the inner dielectric layers was 0, and no defects occurred in the moisture resistance reliability test and the solder heat resistance test.

On the other hand, in the multilayer ceramic capacitors of the sample numbers 5 to 7 which do not satisfy the requirements of preferred embodiments of the present invention, with respect to the average grain size of the dielectric grains included in the inner dielectric layers, the average grain size of the dielectric grains included in the outer dielectric layer was double or more. In addition, in each of the moisture resistance reliability test and the solder heat resistance test, multilayer ceramic capacitors determined to be defective were generated. Further, in the solder heat resistance test, the smaller the content of NiO included in the outer dielectric layers, the larger the number of defects occurred in the solder heat resistance test.

In addition, not only the multilayer ceramic capacitors of the sample numbers 1 to 4 but also the multilayer ceramic capacitors satisfying the requirements of preferred embodiments of the present invention were subjected to the moisture resistance reliability test and the solder heat resistance test, and it was confirmed that no defect occurred.

Method for Manufacturing the Multilayer Ceramic Capacitor

A non-limiting example of a method for manufacturing the above-described multilayer ceramic capacitor 10 will be described below.

First, a ceramic slurry in which a binder and an organic solvent are mixed and dispersed in a dielectric ceramic powder is prepared, and the ceramic slurry is applied on a resin film to produce a ceramic green sheet for an inner dielectric layer. In addition, a ceramic slurry in which a binder and an organic solvent are mixed and dispersed in dielectric ceramic powder and NiO powder is prepared, and the ceramic slurry is applied on a resin film to produce a ceramic green sheet for an outer dielectric layer.

Subsequently, a conductive paste for an internal electrode is prepared, and the conductive paste for the internal electrode is applied on the ceramic green sheet for an inner dielectric layer to form an internal electrode pattern. The conductive paste for the internal electrode includes, for example, Ni powder, an organic solvent, a binder, and the like. For application of the conductive paste for an internal electrode, for example, printing methods such as screen printing and gravure printing can be used.

Subsequently, a predetermined number of ceramic green sheets for outer dielectric layers are stacked, the ceramic green sheets for inner dielectric layers on which the internal electrode pattern is formed are sequentially stacked, and further, a predetermined number of ceramic green sheets for outer dielectric layers are further stacked thereon to produce a stacked body.

Subsequently, the stacked body is pressed by a method such as rigid pressing or isostatic pressing.

Subsequently, the pressed stacked body is cut into a predetermined size by a cutting method such as stamping, cutting with a dicing machine, or cutting with a laser, for example. Thereafter, corners and ridges are rounded by barrel polishing or the like. An unfired multilayer body is provided by the steps described above. In this unfired multilayer body, the internal electrode patterns are exposed at both end surfaces.

Subsequently, a multilayer body is produced by firing the unfired multilayer body. The firing temperature is preferably, for example, about 1250° C. or more and about 1300° C. or less.

Subsequently, a baked electrode layer is formed by applying and baking a conductive paste for an external electrode on both end surfaces of the multilayer body. The baking temperature is preferably, for example, about 870° C. or more and about 900° C. or less.

Subsequently, a plating layer is formed by plating on the baked electrode layer.

Note that although the configuration in which the external electrode includes the baked electrode layer and the plating layer has been described, as described above, the configuration of the external electrode is not limited to such a configuration. Further, the external electrode may be formed by co-firing for forming by simultaneous firing together with the internal electrode.

The multilayer ceramic capacitor 10 can be manufactured by the method described above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of internal electrodes and a plurality of ceramic dielectric layers that are alternately stacked; and
   a plurality of external electrodes provided on surfaces of the multilayer body and electrically connected to the plurality of internal electrodes; wherein
   the multilayer body includes a first main surface and a second main surface that oppose each other in a stacking direction, a first side surface and a second side surface that oppose each other in a width direction orthogonal or substantially orthogonal to the stacking direction, and a first end surface and a second end surface that oppose each other in a length direction orthogonal or substantially orthogonal to the stacking direction and the width direction;
   the plurality of internal electrodes include Ni;
   the plurality of ceramic dielectric layers include:
      an outer dielectric layer located further outside, in the stacking direction, than an outermost one of the plurality of internal electrodes in the stacking direction; and
      an inner dielectric layer located between two of the plurality of internal electrodes adjacent to each other in the stacking direction;
   the outer dielectric layer includes at least Ti and NiO;
   the inner dielectric layer includes at least Ti;
   an average grain size of dielectric grains included in the plurality of ceramic dielectric layers is about 180 nm or more and about 220 nm or less;
   when a ratio of a difference between an average grain size D1 of dielectric grains included in the inner dielectric layer and an average grain size D2 of dielectric grains included in the outer dielectric layer with respect to the average grain size D1 of dielectric grains included in the inner dielectric layer is defined, the ratio satisfies the equation $(D2-D1)/D1 \leq 0.1$;
   a thickness of the inner dielectric layer is about 4 μm or more, a thickness of the outer dielectric layer is about 100 μm or more and about 200 μm or less, and thicknesses of the inner electrodes are about 1 μm or more; and
   a molar amount of NiO with respect to 100 moles of Ti included in the outer dielectric layer is larger by about 0.6 mole or more than a molar amount of NiO with respect to 100 moles of Ti included in the inner dielectric layer.

2. The multilayer ceramic capacitor according to claim 1, wherein
   a dimension in the length direction of the multilayer body is about 1.2 mm or more;
   a dimension in the width direction of the multilayer body is about 0.6 mm or more; and
   a dimension in the stacking direction of the multilayer body is about 0.6 mm or more.

3. The multilayer ceramic capacitor according to claim 1, wherein when a ratio of a difference between continuity K1 of an internal electrode located in a central portion in the stacking direction and continuity K2 of the outermost one of the plurality of internal electrodes in the stacking direction with respect to the continuity K1 of the internal electrode located in the central portion in the stacking direction is defined, the ratio is expressed as $(K1-K2)/K1 \leq 0.1$.

4. The multilayer ceramic capacitor according to claim 1, wherein at least one corner or ridge of the multilayer body is rounded.

5. The multilayer ceramic capacitor according to claim 1, wherein the plurality of ceramic dielectric layers include dielectric grains of a perovskite structure.

6. The multilayer ceramic capacitor according to claim 1, wherein the plurality of internal electrodes include first internal electrodes that extend to the first end surface of the multilayer body and second internal electrodes that extend to the second end surface of the multilayer body.

7. The multilayer ceramic capacitor according to claim 6, wherein
   the first internal electrodes each include a first counter electrode portion that opposes the second internal electrodes, and a first extended electrode portion that extends from the first counter electrode portion to the first end surface of the multilayer body; and
   the second internal electrodes each include a second counter electrode portion that opposes the first internal electrodes, and a second extended electrode portion that extends from the second counter electrode portion to the second end surface of the multilayer body.

8. The multilayer ceramic capacitor according to claim 7, wherein the first counter electrode portion and the second counter electrode portion oppose each other with the inner dielectric layer located therebetween to provide a capacitance.

9. The multilayer ceramic capacitor according to claim 6, wherein
   the plurality of external electrodes include a first external electrode provided on the first end surface of the multilayer body and a second external electrode provided on a second end surface of the multilayer body;
   the first external electrode is electrically connected to the first internal electrodes; and
   the second external electrode is electrically connected to the second internal electrodes.

* * * * *